United States Patent [19]
Yuito

[11] Patent Number: 4,951,893
[45] Date of Patent: Aug. 28, 1990

[54] METHOD AND APPARATUS FOR SPLICING WEBS

[75] Inventor: Fumio Yuito, Shizuoka, Japan

[73] Assignee: Fuji Photo Film Co., Ltd., Kanagawa, Japan

[21] Appl. No.: 319,215

[22] Filed: Mar. 6, 1989

[30] Foreign Application Priority Data

Mar. 7, 1988 [JP] Japan .................................. 63-54399

[51] Int. Cl.⁵ ............................................ B65H 19/18
[52] U.S. Cl. ..................................... 242/58.1; 242/58; 156/324; 156/502
[58] Field of Search .................. 242/55, 58, 58.1, 58.2, 242/58.3, 58.4; 156/64, 324, 353, 366, 378, 502, 504, 506, 543, 555

[56] References Cited

U.S. PATENT DOCUMENTS

| 4,043,520 | 8/1977 | Olsson et al. | 242/58.1 |
| 4,704,180 | 11/1987 | Marsella et al. | 156/502 X |
| 4,859,270 | 8/1989 | Martin et al. | 242/58.1 X |

Primary Examiner—Stuart S. Levy
Assistant Examiner—Steven M. duBois
Attorney, Agent, or Firm—Sughrue, Mion, Zinn, Macpeak & Seas

[57] ABSTRACT

Web splicing method and apparatus for use in a web supply line are disclosed in which the following ends of first and second webs respectively wound around first and second old rolls are respectively spliced to the leading ends of first and second webs wound around first and second new rolls to thereby unwind the first and second spliced webs simultaneously and successively and the first and second spliced webs are superposed on each other at a predetermined meeting point before they are supplied. In the web splicing method and apparatus, the timing of start of splicing of the second web is controlled in accordance with the time of completion of the splicing of the first web so that the relative positions of the respective spliced portions of the first and second webs can be shifted from each other by a preset distance or the relative positions thereof can be made to coincide with each other.

6 Claims, 3 Drawing Sheets

METHOD AND APPARATUS FOR SPLICING WEBS

BACKGROUND OF THE INVENTION

1. Field of the Invention

The present invention relates to method and apparatus for splicing webs together and, in particular, to such method and apparatus for splicing layered webs together, each layered web comprising a plurality of single webs (each single web is a thin, strip-shaped member formed of plastic, paper, metal foil or the like).

2. Description of the Related Art

Conventionally, a plurality of webs are, in some cases, superposed on one another to form a layered web and, for this purpose, a web superposing device is used. As an example of this web superposing device, there is known a device which is disclosed in Japanese Patent Application Laid-open (Tokkai) No. 57-27754 and, in this superposing device, a plurality of base materials (single webs) are respectively immersed in and impregnated with a resin solution before they are superposed on one another. On the other hand, as an example of apparatus for splicing single webs together, there is known an apparatus which is disclosed in Japanese Patent Application Laid-open (Tokkai) No. 61-119555. In this apparatus, with the following end of a preceding or old web butted against the leading end of a following or new web, the old and new webs are spliced together automatically.

By the way, when two webs are spliced together in a process in which the two webs are respectively unwound, from two rolls and are then superposed on each other they form a layered web. At first, in one of the webs, the web following end from the old roll is spliced with the web leading end from the new roll by use of a splicing apparatus. Next, the splicing position of the other web is matched with the splicing position of the above-mentioned one web and then the splicing operation of the other web is carried out manually.

However, the above-mentioned conventional web splicing method provides a poor efficiency in splicing due to the above-mentioned manual operation. Also, in the manual splicing operation, there is the possibility that the web splicing position may be out of place. Thus, necessary a complicated mechanism for removing the web spliced portions in a following treatment process is necessary.

SUMMARY OF THE INVENTION

The present invention aims at eliminating the drawbacks found in the above-mentioned prior art methods and apparatus.

Accordingly, it is an object of the invention to provide method and apparatus for splicing webs together, in which the respective webs can be spliced together with ease and no trouble can be produced in a following treatment process.

In order to achieve the above object, according to one aspect of the invention, there is provided a method for splicing webs in a web supply line in which the following ends of first and second webs respectively wound around first and second old rolls are respectively spliced to the leading ends of first and second webs respectively wound around first and second new rolls to thereby unwind the first and second webs simultaneously and successively and the first and second spliced webs are superposed on each other at a predetermined meeting point before they are supplied, the method comprising the steps of:

splicing the first web wound around the first old roll to the first web wound around the first new roll to form the first spliced web; measuring the length of the first spliced web that is fed out after completion of the splicing of the first web or measuring the time that has elapsed from completion of the splicing of the first web; starting splicing of the second web when the measured length or time reaches a predetermined length or time; and, shifting the relative positions of the respective spliced portions of the first and second spliced webs by a present distance from each other or coinciding the relative positions with each other.

Also, according to another aspect of the invention, there is provided a web splicing apparatus for use in a web supply line, the apparatus comprising: first splicing means responsive to a first web splicing command signal for splicing the following end of a first web wound around a first old roll to the leading end of a first web wound around a first new roll; second splicing means responsive to a second web splicing command signal for splicing the following end of a second web wound around a second old roll to the leading end of a second web wound around a second new roll; superposing means for superposing the first and second spliced webs, which are respectively supplied simultaneously and successively by means of the first and second splicing means, on each other at a predetermined meeting point; measuring means for measuring the length of the first web that is fed out after completion of the slicing of the first web by the first splicing means or measuring the time that has elapsed since the completion of the splicing of the first web by the first splicing means; setting means for setting a predetermined length or time for which the first web is to be fed from the time of completion of the splicing of the first web by the first splicing means to the time of starting of the splicing of the second web by the second splicing means; and, control means for outputting to the second splicing means a command signal for the splicing of the second web, when the length or time measured by the measuring means reaches the predetermined length or time set by the setting means.

In the web splicing method and apparatus according to the invention, one web is spliced to a new web by one web splicing means and, in accordance with the length or time by which the one web is fed out after completion of the splicing of the one web, the timing of starting of the splicing of the other web by the other web splicing means is controlled. Due to this, the two webs can be superposed on each other with the splicing positions thereof being made to coincide with each other or being shifted from each other in an arbitrary manner. For this reason, in a web manufacturing line in which a plurality of webs are superposed on one another, the structure of a mechanism, which is provided downstream in the web manufacturing line for removing the spliced portions of the webs, can be simplified, thereby decreasing the difficulties that could occur in the following treatment processes.

BRIEF DESCRIPTION OF THE DRAWINGS

The exact nature of this invention, as well as other objects and advantages thereof, will be readily apparent from consideration of the following specification relating to the accompanying drawings, in which like reference characters designate the same or similar parts throughout the figures thereof and wherein.

DETAILED DESCRIPTION OF THE INVENTION

A detailed description will hereafter be given of a preferred embodiment of method and apparatus for splicing webs together according to the present invention with reference to the accompanying drawings.

Figure 1:
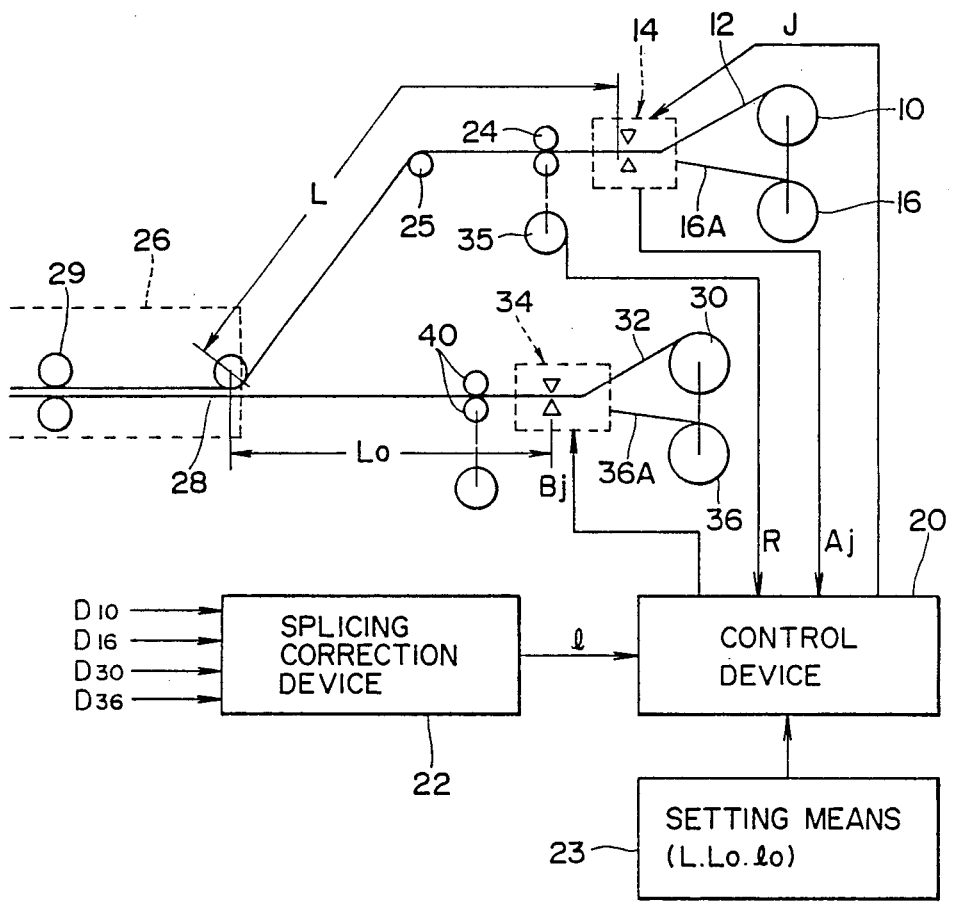
FIG. 1 is an explanatory view to illustrate how a web splicing apparatus according to the invention is used.

Referring first to FIG. 1, there is shown an explanatory view of a web splicing apparatus according to the invention. In FIG. 1, from an old roll 10 (which is located right above in FIG. 1) there is unwound a single web 12 and, when the unwinding of the single web 12 from the old roll 10 comes near to an end, then a butt splicing device 14 is put into operation, that is, a leading end 16A of a web unwound from a new roll 16 is spliced to the following end of the currently preceding web 12 by the butt splicing device 14. As the butt splicing device 14, there can be used a well known device; for example, a butt splicing device which is provided with a cutter and the like and is disclosed in Japanese Patent Application Laid-open (Tokkai) No. 61-119555, can be used.

The operation of the butt splicing device 14 is started by an output signal J from a control device 20. The data of the initial diameters ($D_{10}$, $D_{16}$, $D_{30}$, $D_{36}$) of the rolls 10, 16 for the web 12 and rolls 30, 36 for another web 32 (which will be described later) are respectively input to a splicing correction device 22 which is adapted to output a signal that represents the length l of the web to be fed out from the start of replacement of the old roll by the new roll to the completion of the replacement thereof. It should be noted here that, although in FIG. 1 the starting timing of the operation of the butt splicing device 14 is controlled by the control device 20, the operation of the butt splicing device 14 can also be started by an operator for this purpose.

The single web 12 is passed over two measuring nip rollers 24, 24 and a switch roller 25, and is then carried to a superposing roller 28 which is situated at the entrance of a superposing device 26. In this embodiment, a length extending from the butt splicing device 14 to the superposing roller 28 is set as "L".

On the other hand, from the roll 30 there is unwound the other web 32 which is to be superposed on the above-mentioned web 12. That is, the two webs 12 and 32 are superposed on each other by means of the roller 28 to thereby form a layered web. The layered web is then transferred by a feed roller 29 to a following step. By the way, when the unwinding, of the single web 32 comes near to an end, then the trailing end of the web 32 is butt spliced to the leading end 36A of a web wound around the new roll 36 by a butt splicing device 34. The butt splicing device 34 is similar in structure to the before-mentioned butt splicing device 14 and the operation of the butt splicing device 34 can be started by an output signal $B_j$ which is output from the control device 20. In this embodiment, the length that extends from the butt splicing device 34 to the superposing roller 28 is set as "$L_0$".

A measuring device 35, which is mounted to the nip roller 24 for measuring the length of the web 12, starts to measure the length of the web 12 that is fed out at the time when the control device 20 receives a splicing end signal $A_j$ from the butt splicing device 14 and outputs to the control device 20 a measurement signal R which represents the measured length $L_t$ thereof. Also, to the control device 20, there are applied a signal representing the length l from the splicing correction device 22, and signals respectively representing the abovementioned lengths L, $L_0$, and an amount of shifting lo to be described later from a setting means 23.

The control device 20 is adapted to output the splicing command signal $B_j$ responsive to the above-mentioned measurement signal R. In particular, the control device 20 outputs the splicing command signal $B_j$ when the measured length $L_t$, represented by the measurement signal R, reaches $L_1$. This function is shown in the following equation:

$$L_1 = L - (L_0 + l \pm lo) \qquad (1)$$

where,

L: a web length from the butt splicing device 14 to the superposing roller 28;

$L_0$: a web length from the butt splicing device 34 to the superposing roller 28;

l: a length of a web 12 that is fed out from the time splicing command signal $B_j$ occurs until the completion of the splicing of in a web on a roll 30 to a web on a roll 36 (which is a constant value if conditions including the methods of splicing the web 32, coil diameters and the like are the same); and lo: an amount of shifting between the splicing position of the web 12 and the splicing position of the web 32.

Figure 2A:
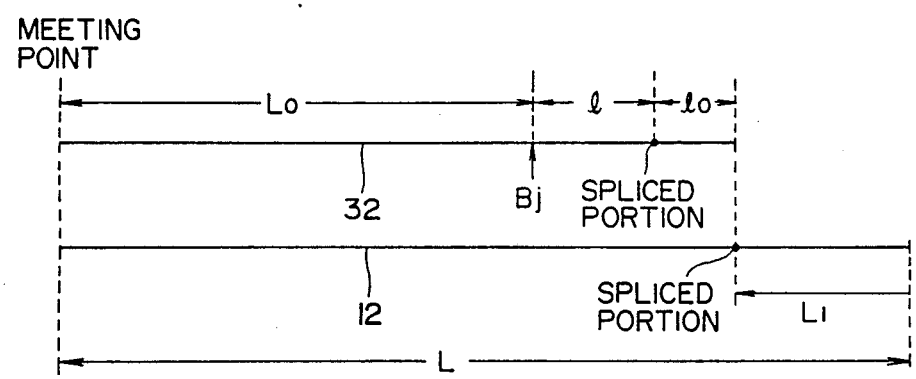
FIGS. 2(A) and 2(B) are respectively typical views used to explain an equation employed in the invention; and, FIGS. 3(A) and 3(B) are respectively explanatory views to illustrate a difference between the superposing positions of the web spliced portions occuring when the timing of the splicing apparatus are changed by a control device.
Figure 2B:
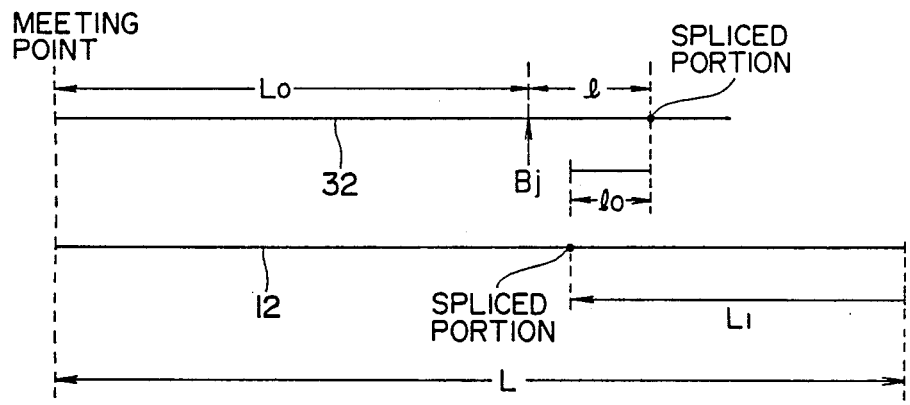

Also, FIGS. 2(A) and 2(B) are respectively typical views to illustrate the above-mentioned equation (1).

Figure 3A:
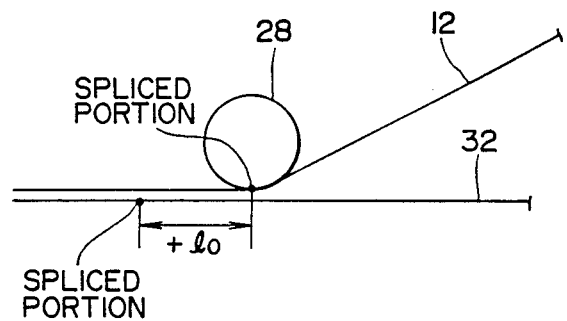
Figure 3B:
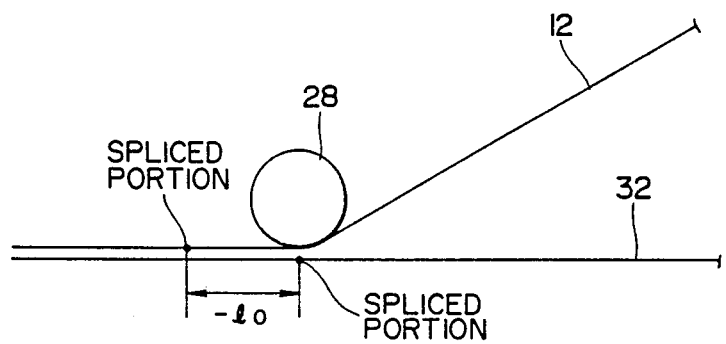

In the above-mentioned equation (1), if the sign of lo is positive, then, as shown in FIGS. 2(A) and 3(A), the splicing position of the web 12 is situated rearwardly with respect to the splicing position of the web 32, and, if the sign of lo is negative, then, as shown in FIGS. 2(B) and 3(B), the splicing position of the web 12 is situated forwardly with respect to the splicing position of the web 32. And, if lo is zero, then the respective splicing positions of the webs 12 and 32 coincide with each other at the superposing roller 28.

In the web splicing apparatus constructed in the above-mentioned manner according to the invention, if it is detected that the rewinding of the roll 10 comes near to an end, then an operation start signal J is output to the butt splicing device 14. In the butt splicing device 14, according to the operation start signal J, the butt splicing of the web 12 is performed in order to replace the old roll 10 by the new roll 16. Next, the length of the web 12 that is fed out after completion of the splicing of the web 12 is measured by the measuring device 35, provided in the nip roller 24, and the measured length is then input to the control device 20 as the measurement signal R. If the web 12 is fed up to the predetermined length $L_1$ that satisfies the above-mentioned equation (1), then the signal $B_j$ is transmitted from the control device 20 to the butt splicing device 34, so that the web following end of the roll 30 is spliced to the web leading end 36A of the roll 36. And, the splicing position of the web 12 and the splicing position of the web 32 coincide with each other in the superposing roller 28.

As mentioned above, according to the present web splicing apparatus, since the splicing start timing of the butt splicing device 34 can be set by the control device 20, the splicing positions of the two webs 12 and 32 can be determined accurately with respect to each other so that the spliced positions removing mechanism and the like in the following treatment process can be simplified in structure. In addition, due to the fact the splicing operations are not performed manually but all webs can be spliced automatically, the efficiency of the splicing operation can be improved.

In view of the fact that, if the web speed is constant, then the web length $L_t$ to be measured by the measuring device 35 corresponds to the time that has elapsed from the time of completion of the splicing of the web 12, the elapsed time from completion of the web 12 splicing may be measured in place of the web length $L_t$. In this case, however, instead of the predetermined length $L_1$ in the above-mentioned equation (1), a predetermined time which corresponds to the length $L_1$ must be set previously, and the splicing command signal $B_j$ must be output when the measured time reaches the previously set, predetermined time.

Also, in the above-described embodiment of the invention, there have been illustrated the web splicing method and apparatus in which two webs 12 and 32 are superposed on each other. However, the invention is not limited to this, but, according to the invention, even in a case when three or more webs are to be superposed on one another, the webs can be spliced together in a simple manner by adjusting the respective butt splicing devices by means of the control device 20 as in the above embodiment.

As has been described hereinbefore, according to the web splicing method and apparatus of the invention, since there can be provided a plurality of splicing devices and the splicing positions of the respective webs can be determined accurately with respect to one another by a control device, the operations of splicing the webs can be performed with ease and also the web that is formed of a plurality of webs is free from difficulties in the following treatment process.

It should be understood, however, that there is no intention to limit the invention to the specific forms disclosed but on the contrary, the invention is to cover all modifications, alternate constructions and equivalents falling within the spirit and scope of the invention as expressed in the appended claims.

What is claimed is:

1. A method for splicing webs in a web supply line in which the following ends of first and second webs respectively wound around first and second old rolls are respectively spliced to the leading ends of first and second webs respectively wound around first and second new rolls to thereby unwind the first and second webs simultaneously and successively and the first and second spliced webs are superposed on each other at a predetermined meeting point before they are supplied, said method comprising the steps:

splicing said first web wound around said first old roll to said first web wound around said first new roll to form said first spliced web;

measuring the length of said first spliced web that is fed out after completion of said splicing of said first web or measuring the time that has elapsed from completion of said splicing of said first web;

starting splicing of said second web when said measured length or time reaches a predetermined length or time; and, shifting the relative positions of the respective spliced portions of said first and second spliced webs by a preset distance from each other or coinciding said relative positions with each other.

2. A method as set forth in claim 1, wherein said first spliced web is the web that has a greater length, which extends from the spliced position thereof to said predetermined meeting point, than the other.

3. A method as set forth in claim 1 or 2, wherein said predetermined length or time is set in accordance with the respective lengths of said first and second spliced webs extending from the respective spliced portions thereof to said predetermined meeting point, the length of said first spliced web that is fed out from the starting of said splicing of said second web to the completion of said splicing of said second web, and the amount of shifting between the respective spliced portions of said first and second spliced webs.

4. A web splicing apparatus for use in a web supply line, said apparatus comprising:

first splicing means responsive to a first web splicing command signal for splicing the following end of a first web wound around a first old roll to the leading end of a first web wound around a first new roll;

second splicing means responsive to a second web splicing command signal for splicing the following end of a second web wound around a second old roll to the leading end of a second web wound around a second new roll;

superposing means for superposing said first and second spliced webs, which are respectively supplied simultaneously and successively by means of said first and second splicing means, on each other at a predetermined meeting point;

measuring means for measuring the length of said first spliced web that is fed out after completion of said splicing of said first spliced web by said first splicing means or measuring the time that has elapsed since the completion of said splicing of said first web by said splicing means;

setting means for setting a predetermined length or time for which said first spliced web is to be fed from completion of said splicing of said first web by said first splicing means to starting of said splicing of said second web by said second splicing means; and, control means, when the length or time that is measured by said measuring means reaches said predetermined length or time set by said setting means, for outputting to said second splicing means said second web splicing command signal.

5. A web splicing apparatus as set forth in claim 4, wherein said setting means sets said predetermined length or time in accordance with the respective lengths of said first and second spliced webs respectively extending from the respective spliced positions thereof by said first and second splicing means to said predetermined meeting point in said superposing means, the length of said first spliced web that is fed out from starting of said splicing of said second web to completion of said splicing of said second web, and the amount of shifting between the respective spliced portions of said first and second spliced webs.

6. A web splicing apparatus as set forth in claim 5, wherein said setting means sets a predetermined length $L_1$ which is shown in the following equation:

$$L_1 = L - (L_0 + l \pm lo)$$

where $L$, $L_0$ respectively represent the lengths of said first and second spliced webs; $l$ represents the length of said first spliced web that is fed out from starting of said splicing of second web to completion of said splicing of said second web; and $\pm lo$ represents the amount of shifting between the respective spliced portions of said first and second spliced webs.

* * * * *